(12) United States Patent
Wang

(10) Patent No.: US 8,086,269 B2
(45) Date of Patent: Dec. 27, 2011

(54) MODULAR STRUCTURE TO EXPAND AND ENHANCE SUBSCRIBER IDENTITY MODULE CARD FUNCTIONALITY

(75) Inventor: Pen-Lo Wang, Longtan Township, Taoyuan County (TW)

(73) Assignee: A-Men Technology Corporation, Taoyuan County (TW)

( * ) Notice: Subject to any disclaimer, the term of this patent is extended or adjusted under 35 U.S.C. 154(b) by 678 days.

(21) Appl. No.: 12/209,702

(22) Filed: Sep. 12, 2008

(65) Prior Publication Data

US 2010/0069118 A1 Mar. 18, 2010

(51) Int. Cl.
*H04B 1/38* (2006.01)
(52) U.S. Cl. .................................. 455/558; 455/551
(58) Field of Classification Search .................. 455/558, 455/557, 556.1, 551
See application file for complete search history.

(56) References Cited

U.S. PATENT DOCUMENTS

| | | | |
|---|---|---|---|
| 5,887,266 A * | 3/1999 | Heinonen et al. | 455/558 |
| 6,092,133 A * | 7/2000 | Erola et al. | 710/301 |
| 6,418,326 B1 * | 7/2002 | Heinonen et al. | 455/558 |
| 6,484,024 B1 * | 11/2002 | Darnault et al. | 455/418 |
| 6,728,553 B1 * | 4/2004 | Lehmus et al. | 455/558 |
| 6,766,177 B2 * | 7/2004 | Chambon et al. | 455/550.1 |
| 6,954,653 B2 * | 10/2005 | Morita | 455/550.1 |
| 7,344,074 B2 * | 3/2008 | Markkanen et al. | 235/451 |
| 7,769,410 B2 * | 8/2010 | Wang | 455/558 |
| 7,865,141 B2 * | 1/2011 | Liao et al. | 455/41.2 |
| 2007/0129103 A1 * | 6/2007 | Al-Shaikh | 455/551 |
| 2007/0275759 A1 * | 11/2007 | Kemppinen | 455/558 |
| 2008/0276456 A1 * | 11/2008 | Launay et al. | 29/832 |
| 2009/0093272 A1 * | 4/2009 | Saarisalo et al. | 455/558 |
| 2009/0275364 A1 * | 11/2009 | Morel et al. | 455/558 |
| 2009/0312054 A1 * | 12/2009 | Choi | 455/558 |
| 2010/0227553 A1 * | 9/2010 | Charrat et al. | 455/41.1 |

* cited by examiner

*Primary Examiner* — Nay A Maung
*Assistant Examiner* — Cindy Trandai
(74) *Attorney, Agent, or Firm* — Leong C. Lei

(57) ABSTRACT

The present invention relates to a new improved modular structure to expand and enhance SIM (Subscriber Identity Module) card functionality, in which an expansion and enhancement module is fitted to a predetermined mobile communication device, and the predetermined mobile communication device comprises a subscriber identity module. The subscriber identity module is configured with an electrical connection module, and the electrical connection module is electrically connected with a controller, which can be an NFC (Near Field Communication) module. The controller is electrically connected with a subscriber identity chip and a Dual-interface card (Combi card), and the Dual-interface card is electrically connected with an antenna. Hence, according to the structure described above, the present invention is able to achieve contactless type transactions without the need to replace the SIM card or system operator.

4 Claims, 18 Drawing Sheets

MODULAR STRUCTURE TO EXPAND AND ENHANCE SUBSCRIBER IDENTITY MODULE CARD FUNCTIONALITY

BACKGROUND OF THE INVENTION (a) Field of the Invention

The present invention provides a structure to expand and enhance a SIM (Subscriber Identity Module) card, and more particularly provides an improved modular structure to expand and enhance SIM card functionality.

(b) Description of the Prior Art

With the advancement in science and technology, the technology of mobile communication devices has also developed by leaps and bounds. Early mobile communication devices had a single function, while present mobile communication devices are already provided with functions including high speed transmission, multimedia functionality, electronic purchasing, and so on.

Electronic purchasing is one of the current most widespread applications, whereby, after a mobile communication device connects to the Internet; electronic purchasing is generally carried out through an operation interface of a handset. However, such electronic purchasing must be carried out through an Internet connection; however, not all mobile communication devices support broadband Internet access, thereby limiting effectiveness thereof.

Hence, operators have developed Dual-interface cards provided with contactless sensor functionality. Referring to FIG. 1, which shows an external elevational view of a Dual-interface card of the prior art, and it can be clearly seen from the drawing that a Dual-interface card 1 is fitted with a chip 10 and defined with a through hole 11. Moreover, a flexible board 2 is attached to the Dual-interface card 1, and the flexible board 2 is provided with contacts 20 and a user identity chip 21. The contacts 20 form electrical contact with the chip 10, and the user identity chip 21 penetrates the through hole 11. Accordingly, the Dual-interface card 1 can still be inserted into a SIM (Subscriber Identity Module) card slot of a mobile communication device after being attached to the flexible board 2.

Furthermore, an antenna 23 extends from the flexible board 2 via a flexible flat cable 22. Hence, after, the Dual-interface card 1 is attached to the flexible board 2 and installed into a mobile communication device, then the mobile communication device is able to carry out contactless transaction via the antenna 23 of the flexible board 2 and the user identity chip 21. If the user identity chip 21 is stored with account data and financial data interchange, then the mobile communication device is able to carry out sensor transactions with the contactless sensor station.

However, the following problems and shortcomings still exist in the usage mode of the aforementioned Dual-interface card 1 combined with the flexible board 2, and are in need of improvement:

The Dual-interface card 1 of the prior art is attached directly to the flexible board 2, and account data of the user is burned into the user identity chip 21, and the user identity chip 21 connecting control signals enable mutual communication effectiveness with the mobile communication device. However, such a scheme causes the user to have to replace the original SIM card or system operator, thereby making it difficult to promote, as well as impinging upon the rights and interests of the original communication system operator (having to replace the SIM card), and thus easily causing cut-throat market competition.

Hence, it is the strong desire of the inventor and manufacturers engaged in related art and purpose of the present invention to resolve and surmount existent technical difficulties to resolve the problems and shortcomings of the aforementioned prior art.

SUMMARY OF THE INVENTION

Hence, in light of the shortcomings of the aforementioned prior art, the inventor of the present invention, having collected related data, and through evaluation and consideration from many aspects, as well as having accumulated years of experience in related arts, through continuous testing and improvements has designed a new improved modular structure to expand and enhance SIM (Subscriber Identity Module) card functionality with an antenna which can be separated and assembled.

A primary objective of the present invention lies in an expansion and enhancement module fitted to a predetermined mobile communication device, and the predetermined mobile communication device comprises a subscriber identity module. The subscriber identity module is configured with an electrical connection module, and the electrical connection module is electrically connected with a controller, which can be an NFC (Near Field Communication) module. The controller is electrically connected to a subscriber identity chip and a Dual-interface card (Combi card). According to the art described above, the present invention provides a breakthrough in solving the existing problems of mobile communication devices of the prior art having to replace the SIM card or system operator when carrying out contactless transactions, and achieves eliminating the need to replace the SIM card or system operator while realizing the practical advancement of achieving contactless transactions.

To enable a further understanding of said objectives and the technological methods of the invention herein, a brief description of the drawings is provided below followed by a detailed description of the preferred embodiments.

DETAILED DESCRIPTION OF THE PREFERRED EMBODIMENTS

Figure 1:
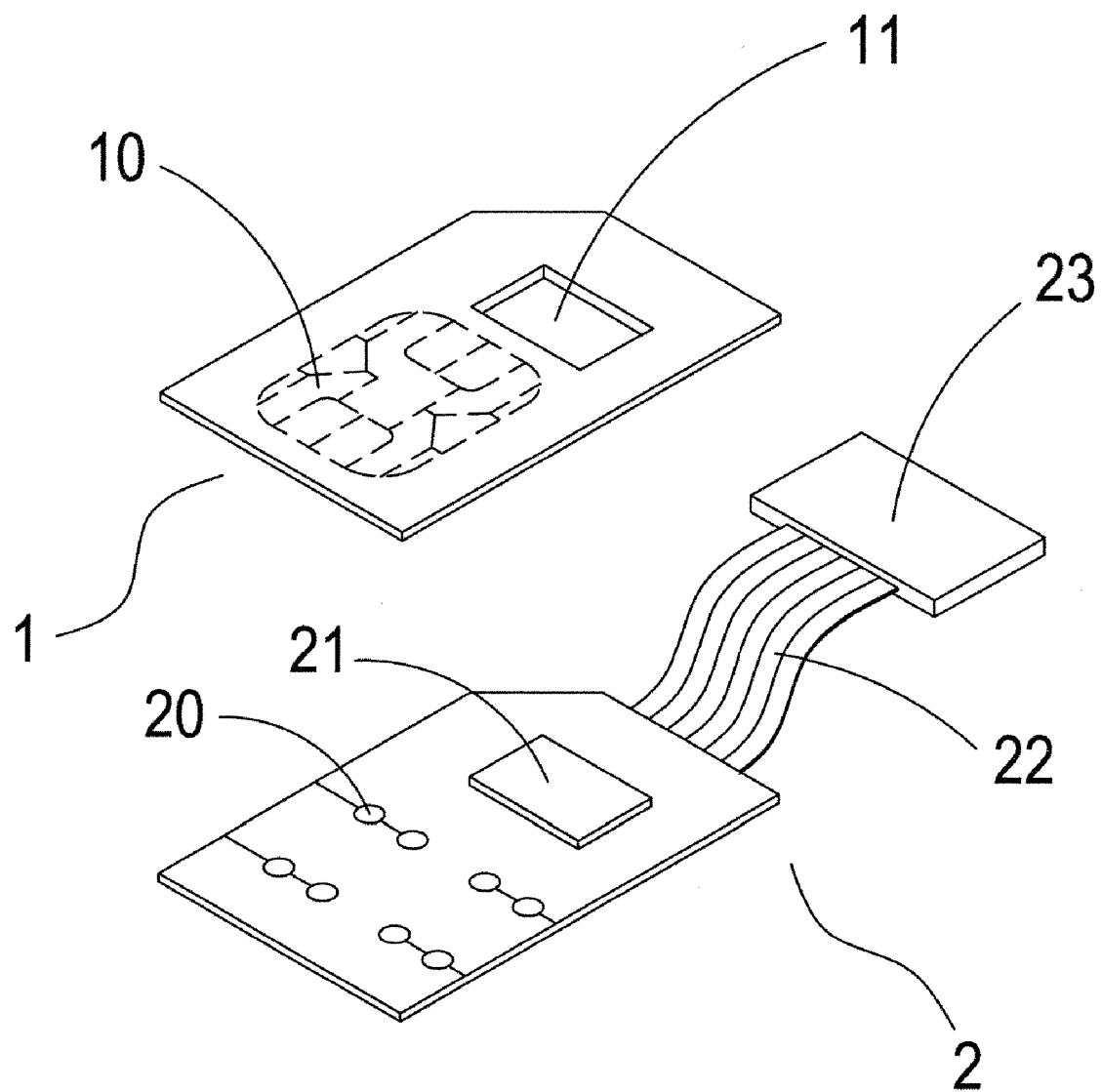
FIG. 1 shows an external elevational view of a Dual-interface card of the prior art.
Figure 2:
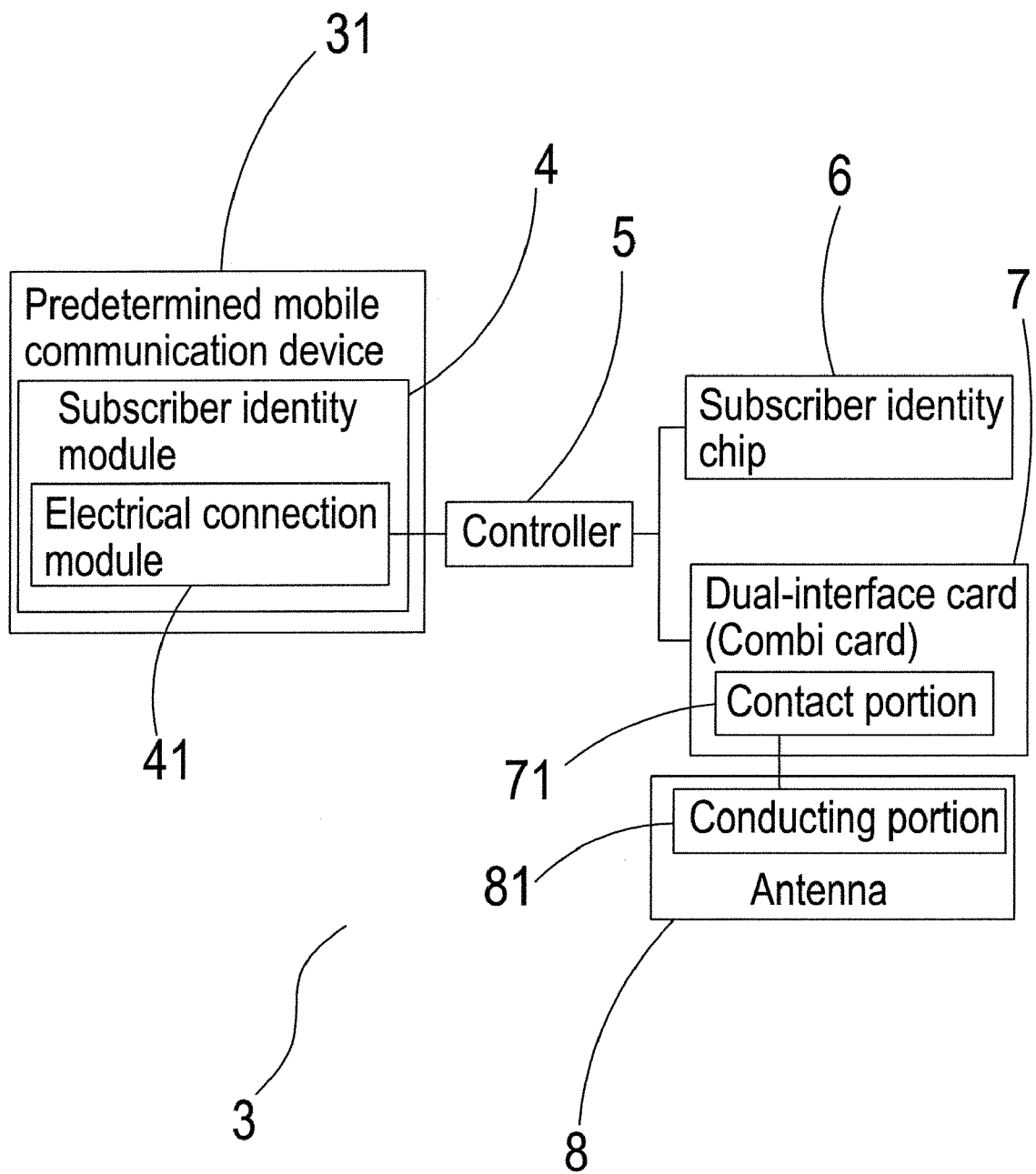
FIG. 2 shows a block diagram of a preferred embodiment of the present invention.
Figure 3:
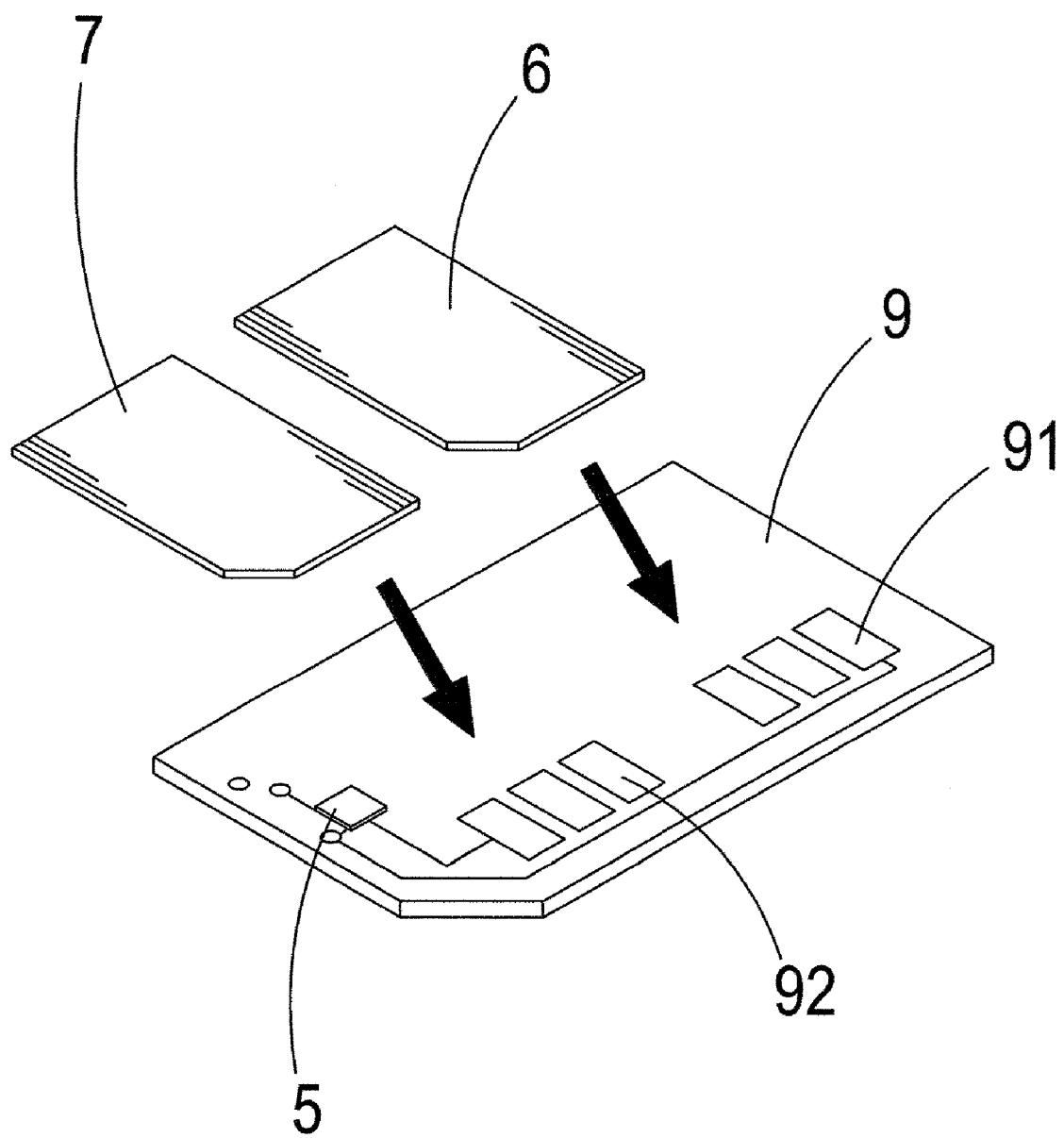
FIG. 3 shows an implementation schematic view 1 of the preferred embodiment of the present invention.
Figure 4:
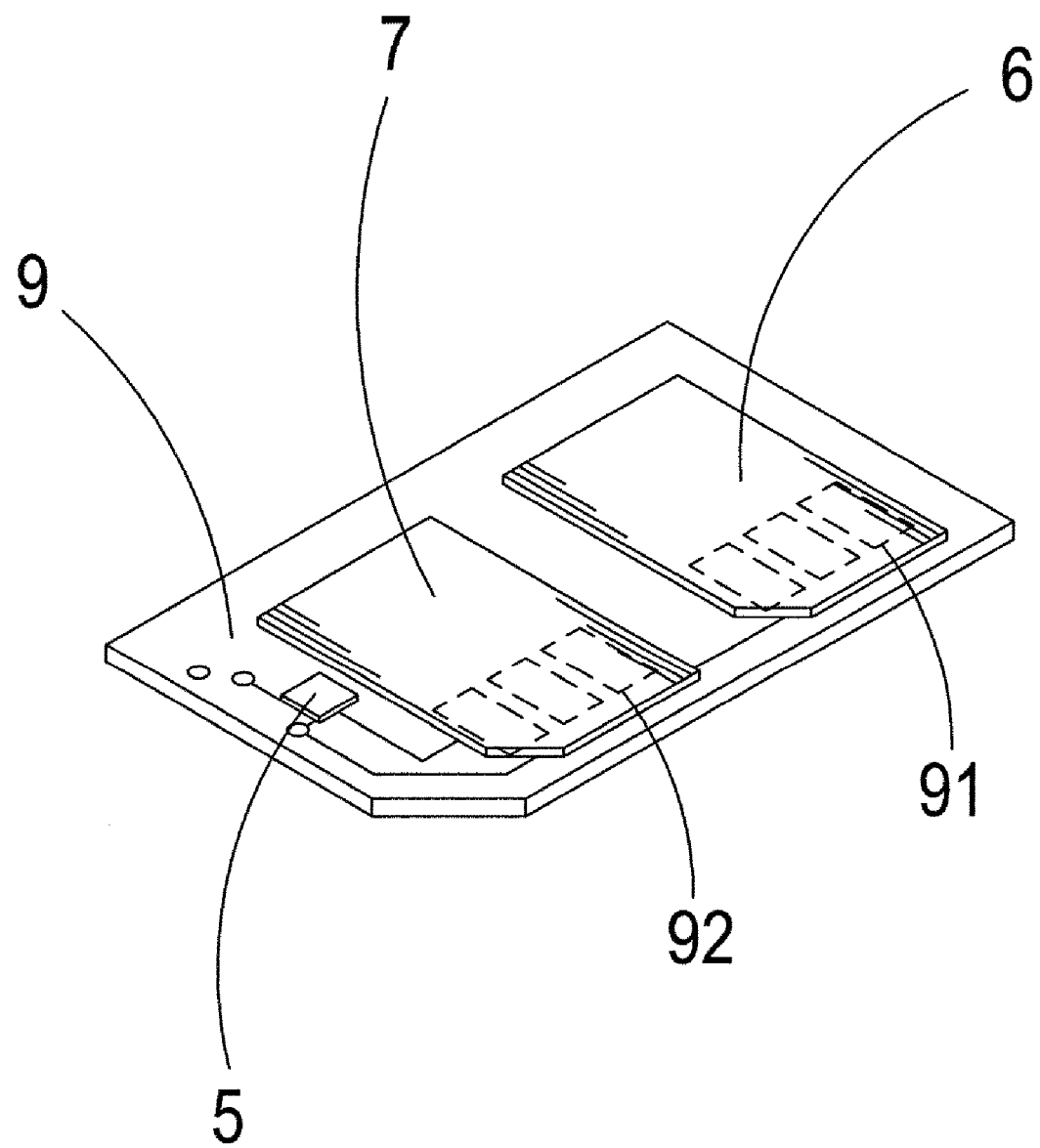
FIG. 4 shows an implementation schematic view 2 of the preferred embodiment of the present invention.
Figure 5:
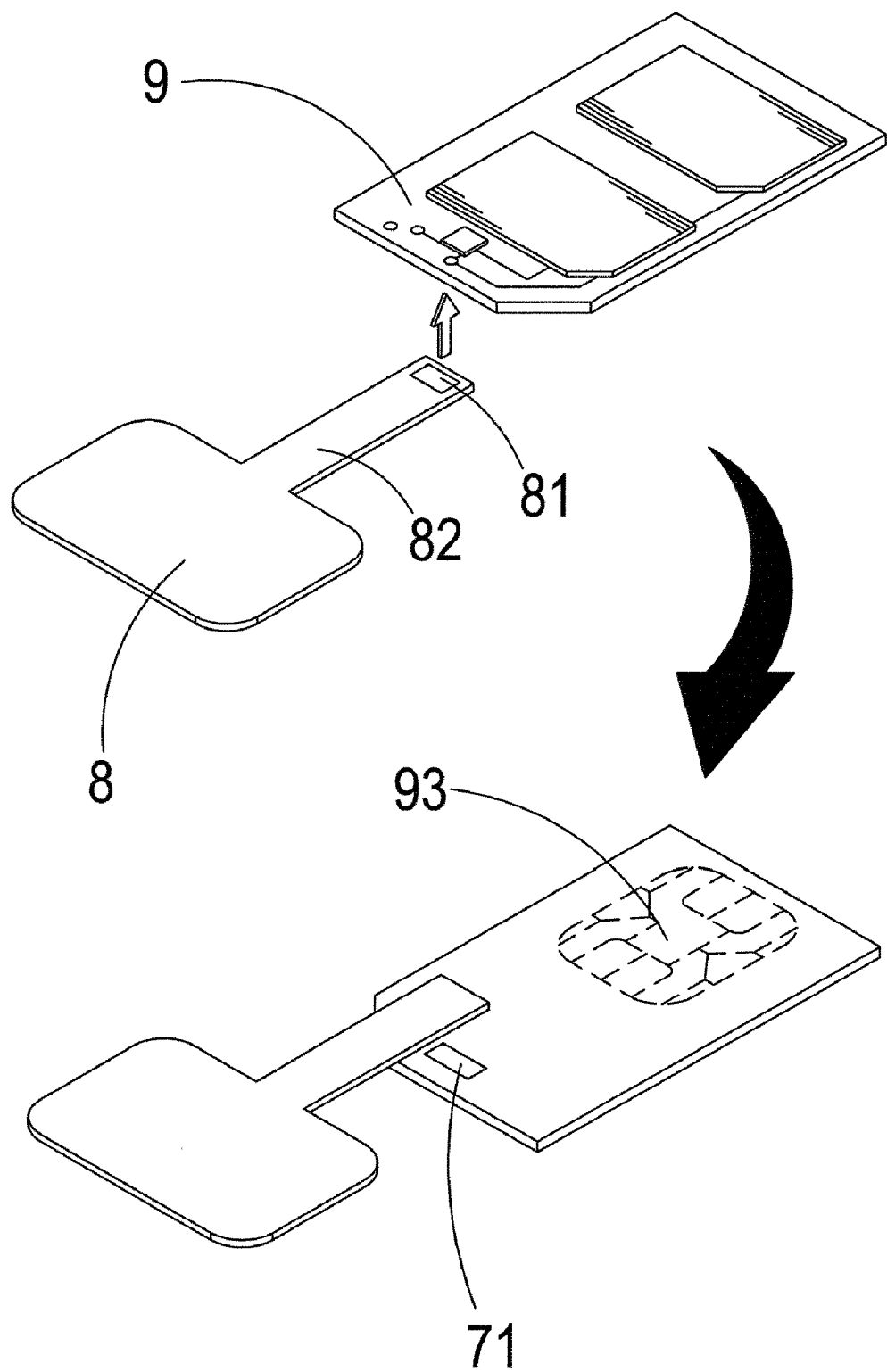
FIG. 5 shows an implementation schematic view 3 of the preferred embodiment of the present invention.
Figure 6:
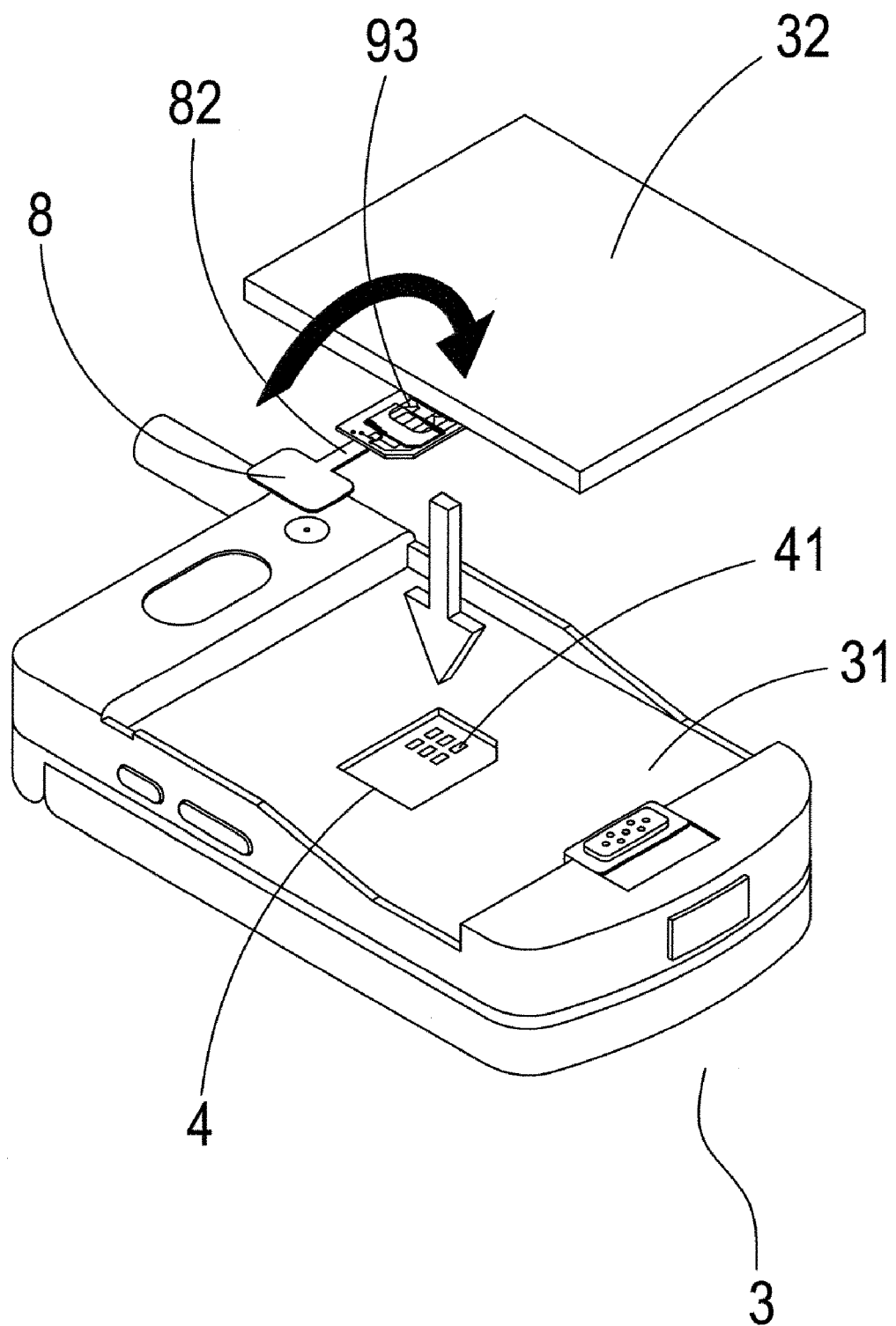
FIG. 6 shows an implementation schematic view 4 of the preferred embodiment of the present invention.
Figure 7:
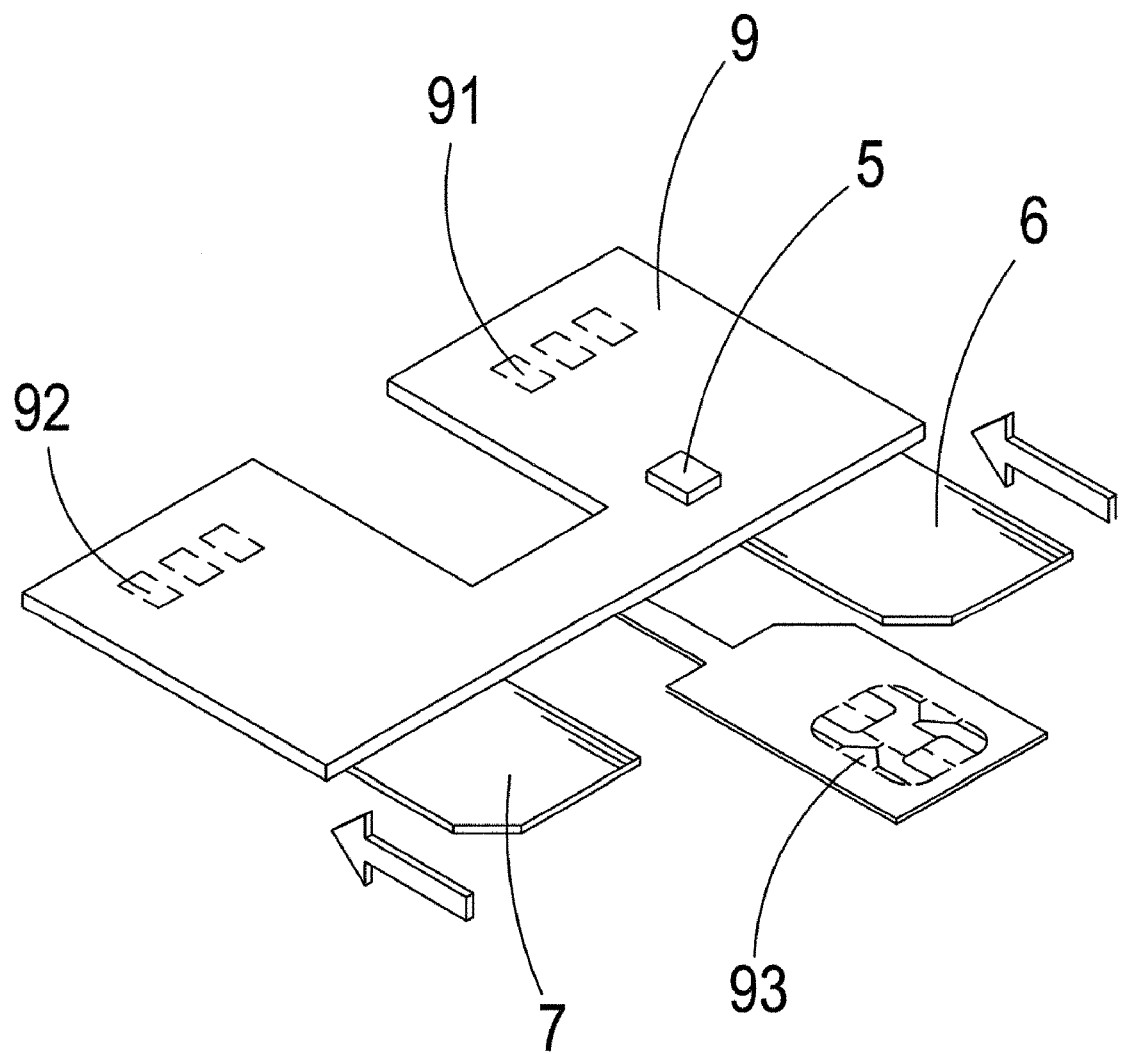
FIG. 7 shows an implementation schematic view 1 of another preferred embodiment of the present invention.
Figure 8:
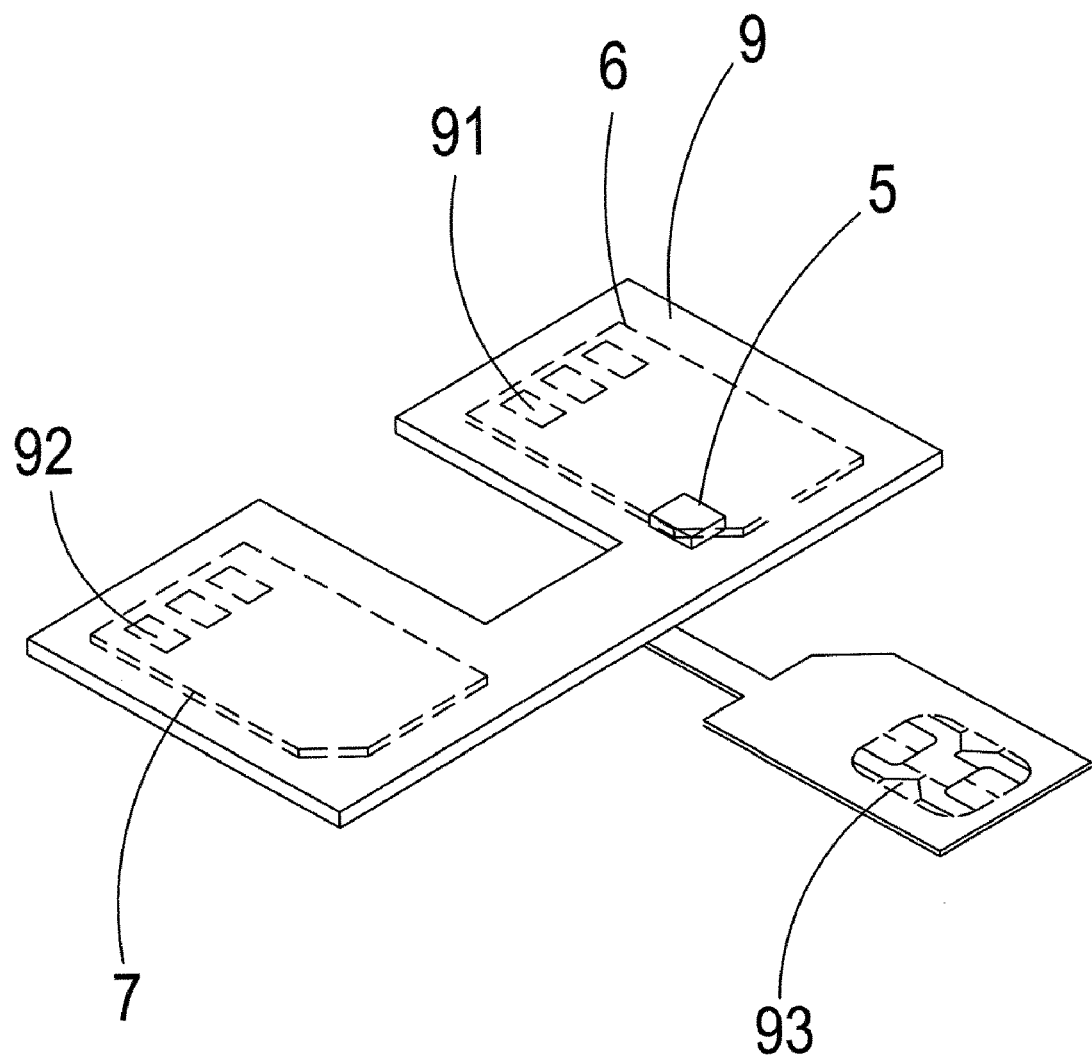
FIG. 8 shows an implementation schematic view 2 of the other preferred embodiment of the present invention.
Figure 9:
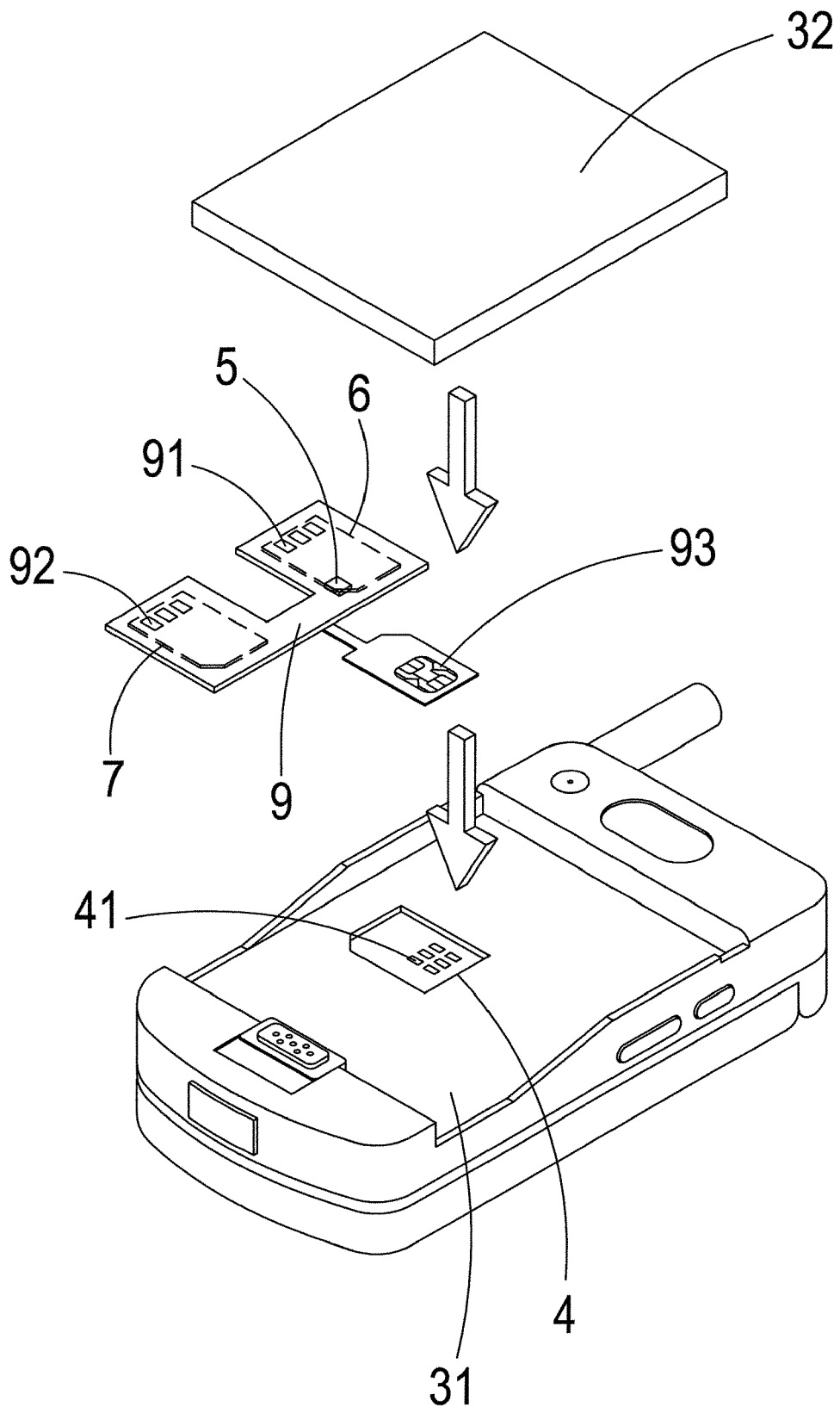
FIG. 9 shows an implementation schematic view 3 of the other preferred embodiment of the present invention.
Figure 10:
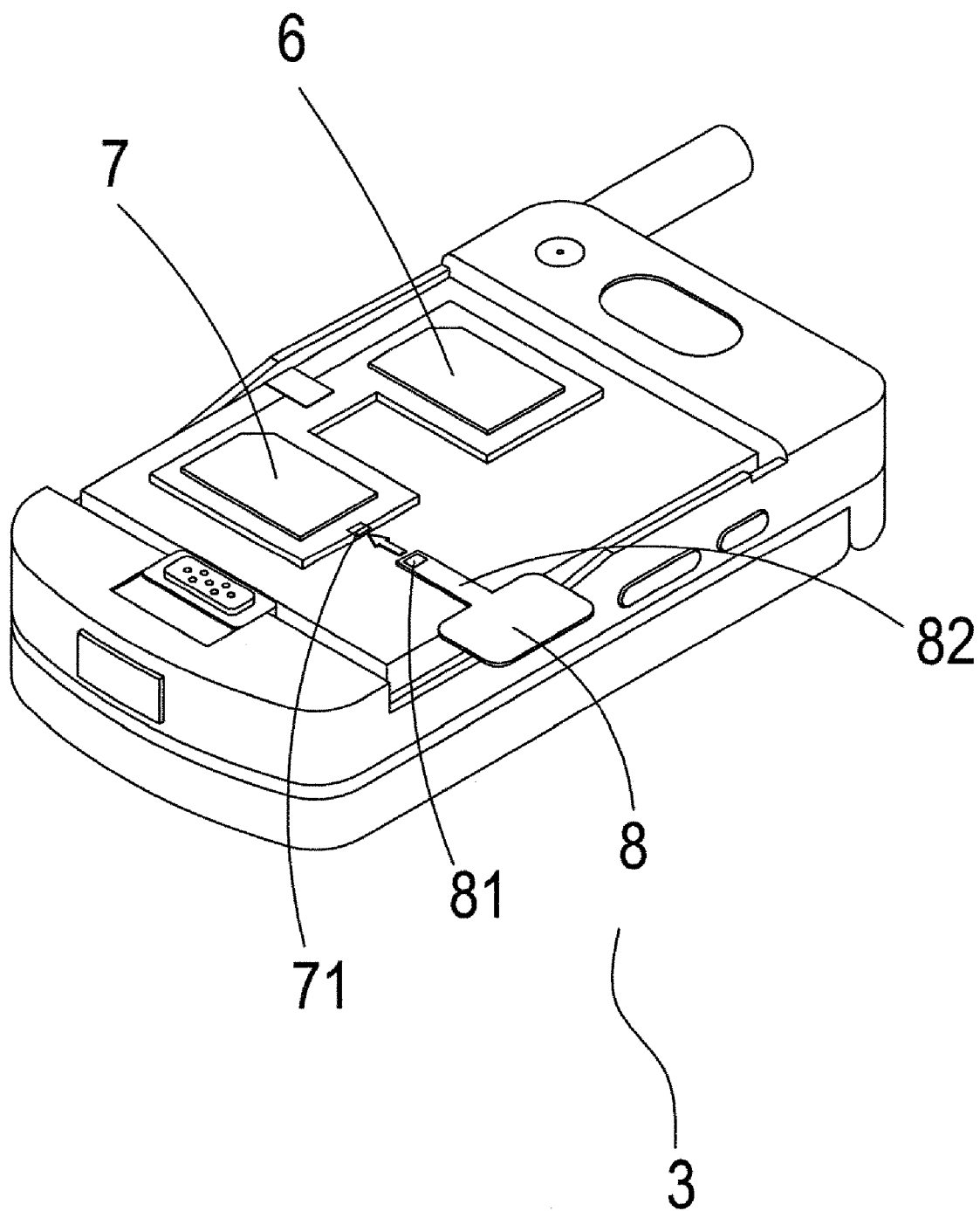
FIG. 10 shows an implementation schematic view 4 of the other preferred embodiment of the present invention.
Figure 11:
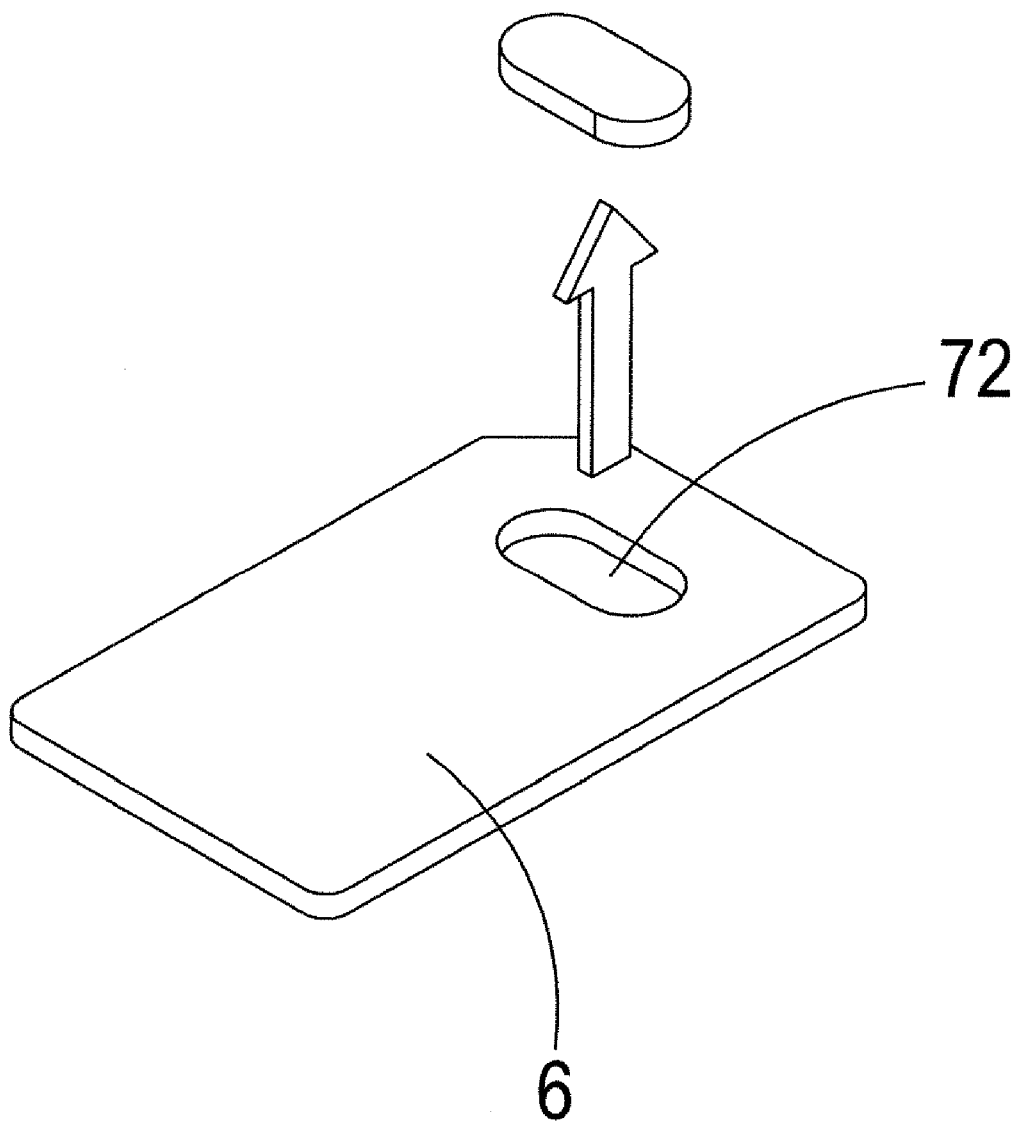
FIG. 11 shows an implementation schematic view 1 of yet another preferred embodiment of the present invention.
Figure 12:
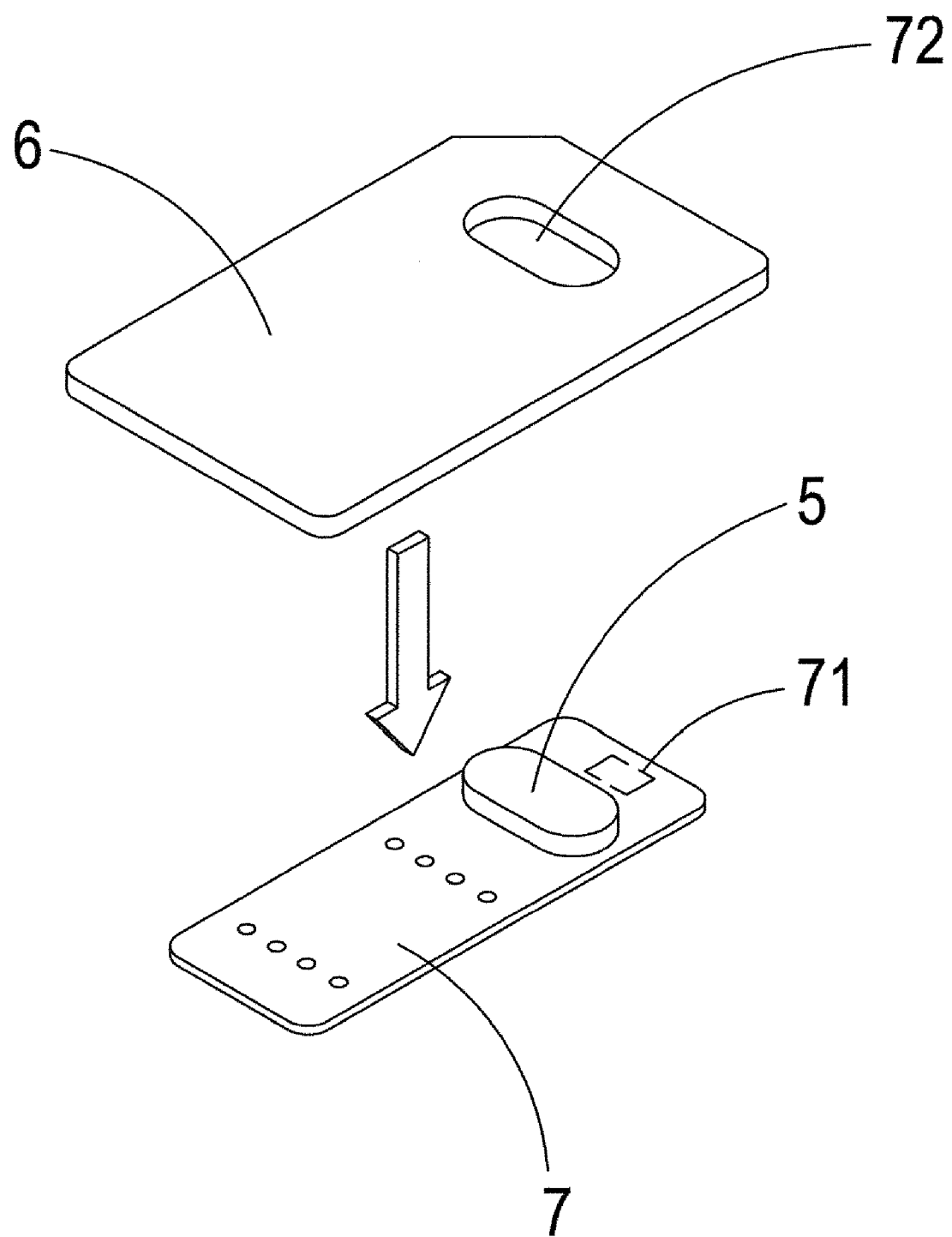
FIG. 12 shows an implementation schematic view 2 of the yet another preferred embodiment of the present invention.
Figure 13:
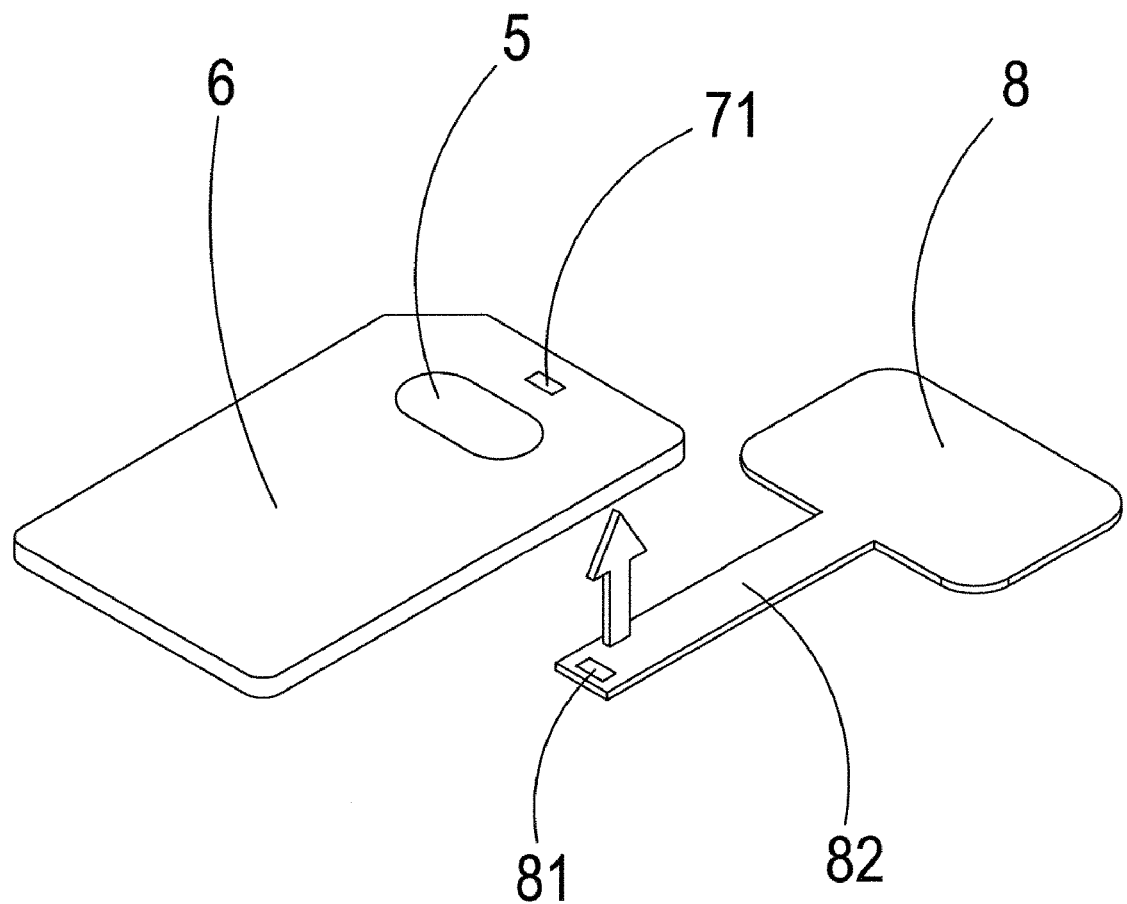
FIG. 13 shows an implementation schematic view 3 of the yet another preferred embodiment of the present invention.
Figure 14:
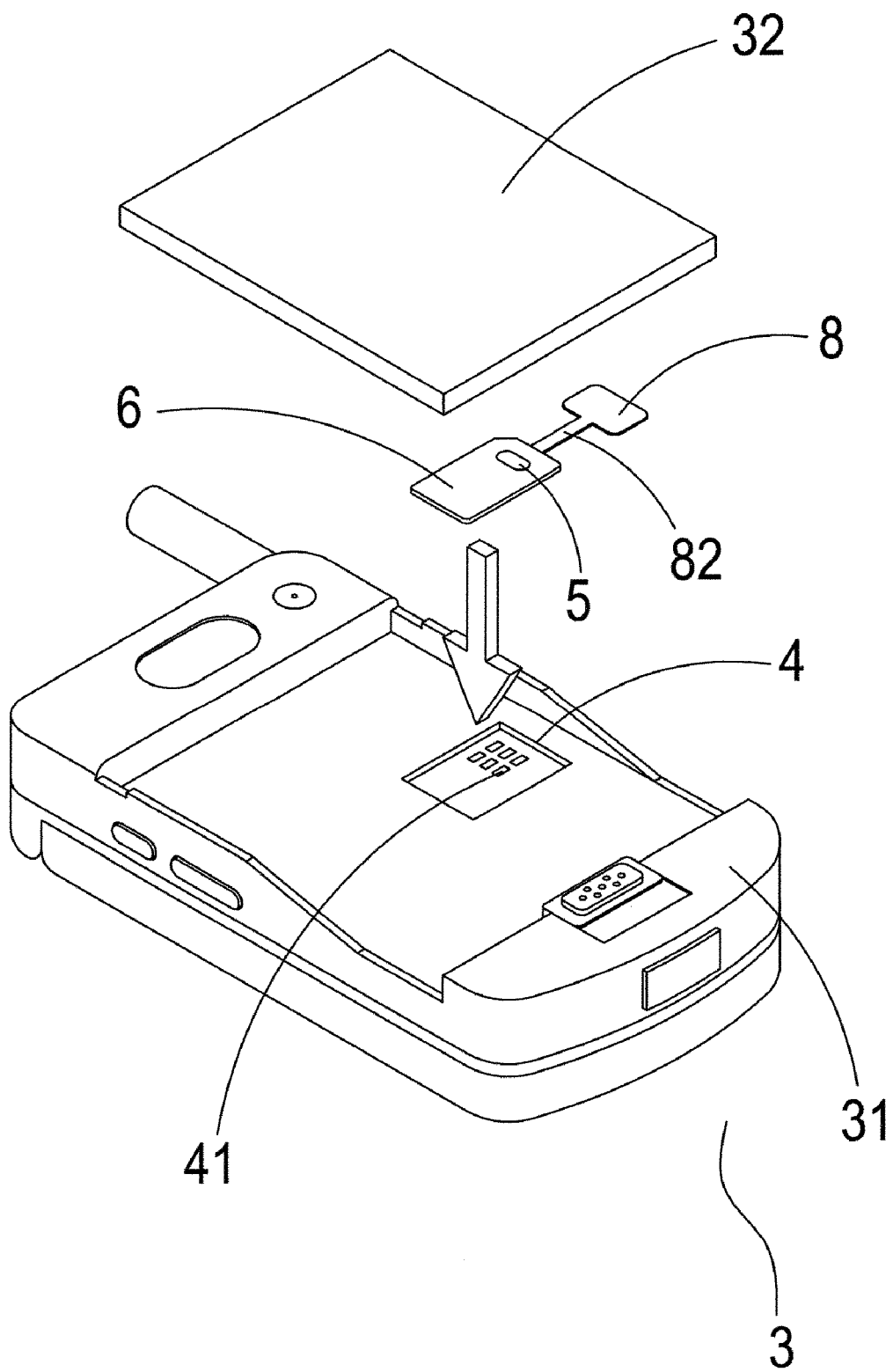
FIG. 14 shows an implementation schematic view 4 of the yet another preferred embodiment of the present invention.
Figure 15:
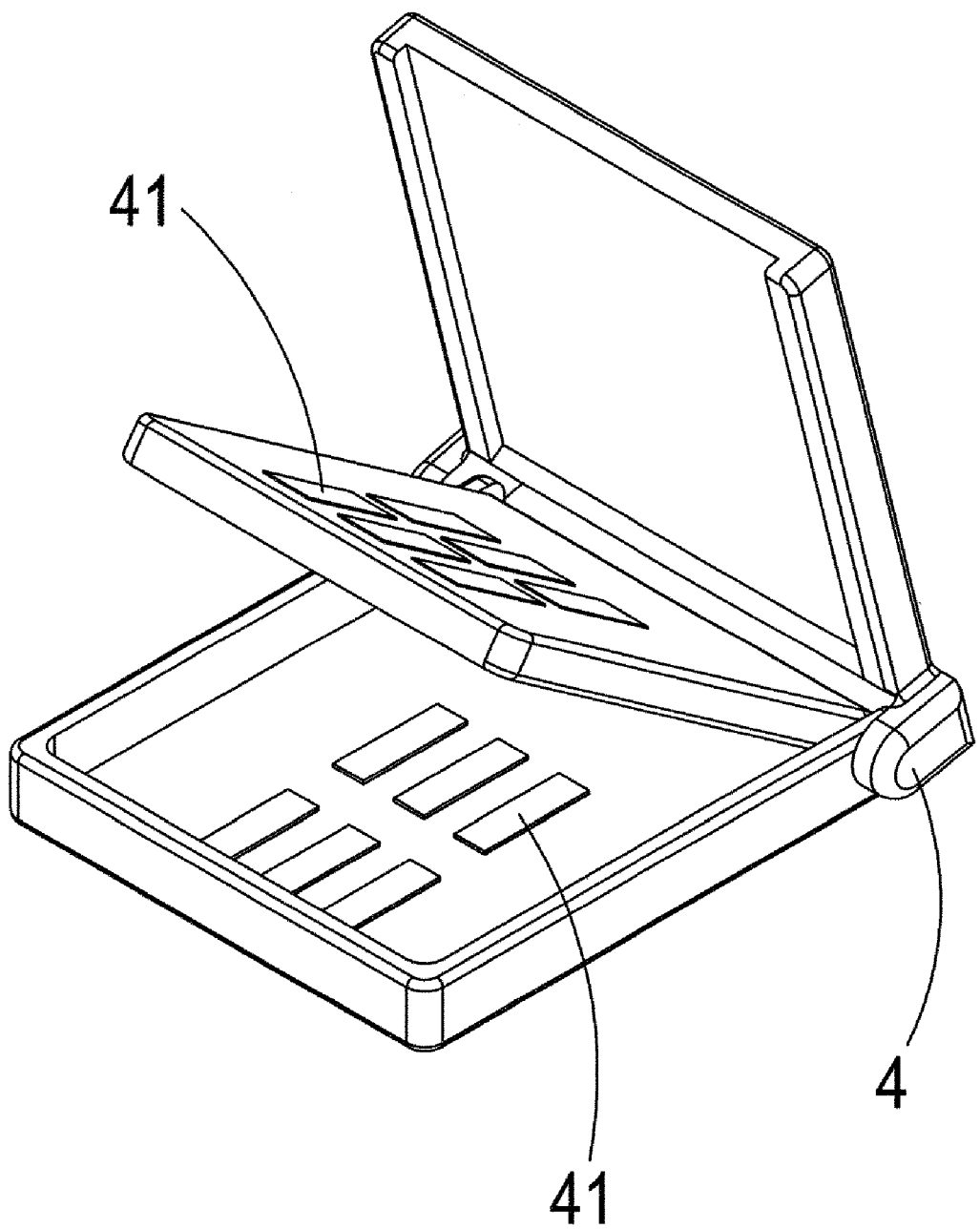
FIG. 15 shows an implementation schematic view 1 of a further preferred embodiment of the present invention.
Figure 16:
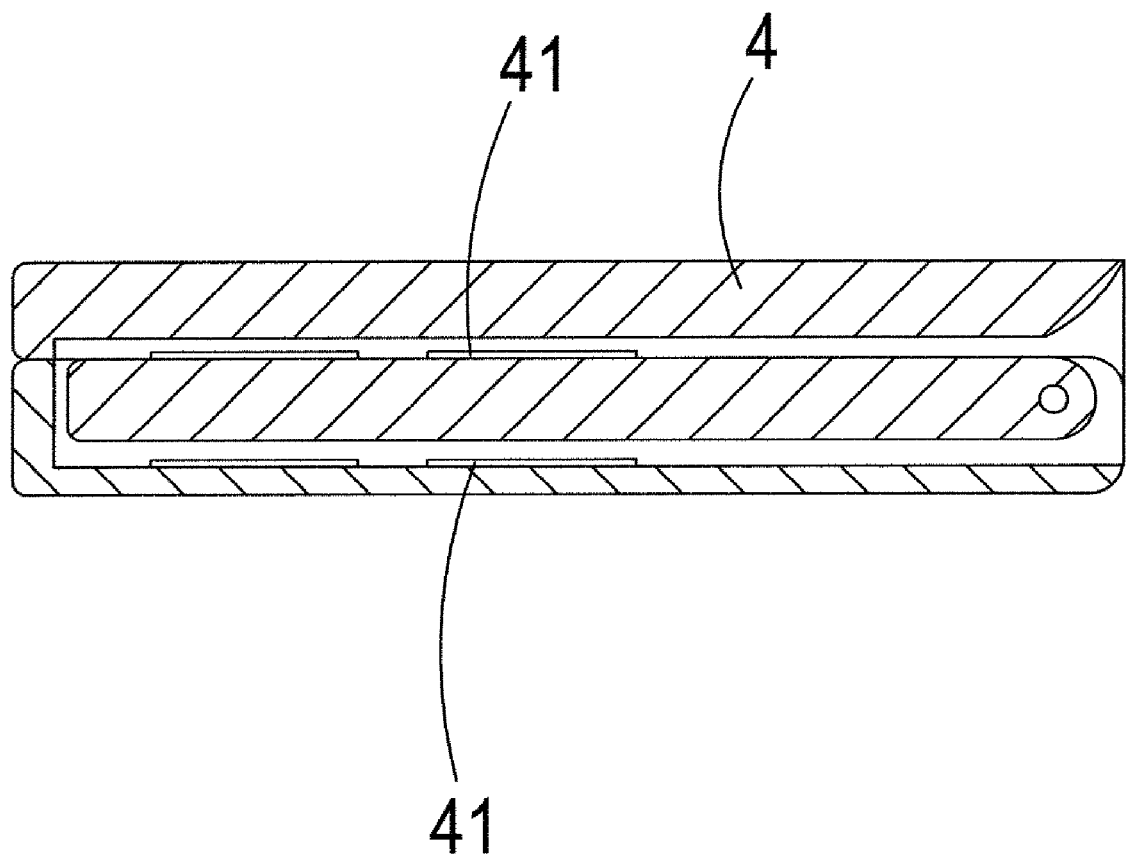
FIG. 16 shows an implementation schematic view 2 of the further preferred embodiment of the present invention.
Figure 17:
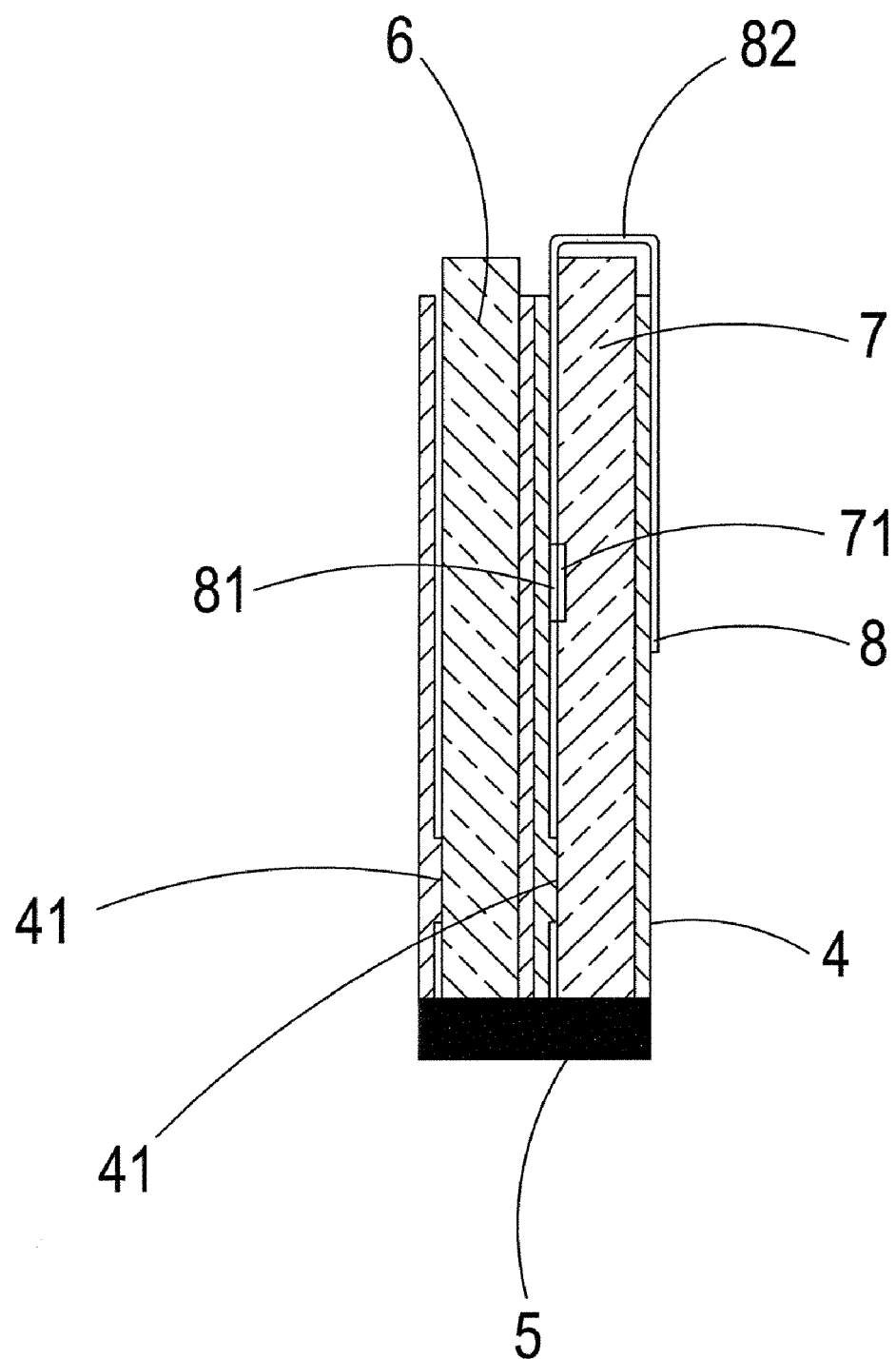
FIG. 17 shows an implementation schematic view 3 of the further preferred embodiment of the present invention.
Figure 18:
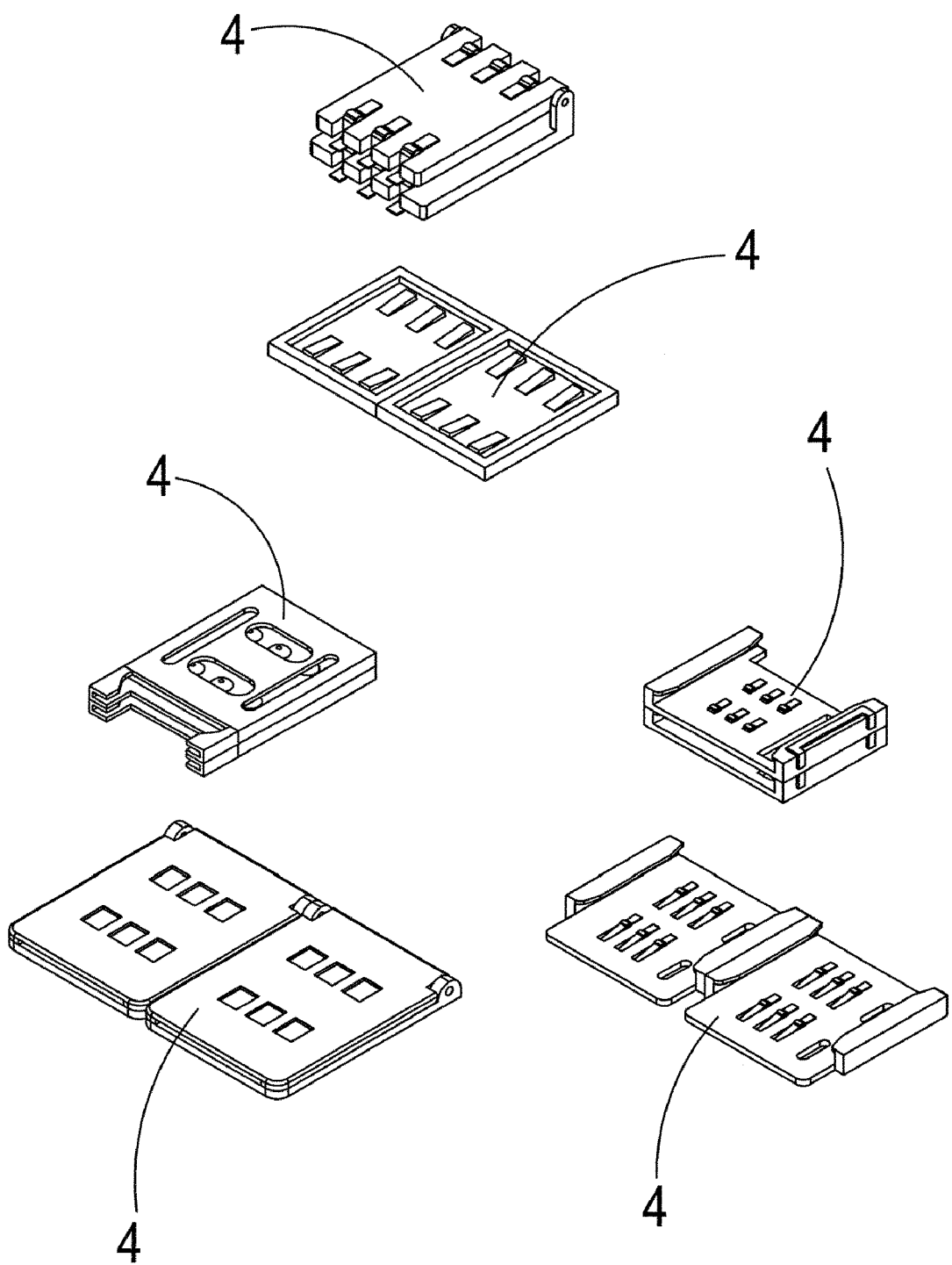
FIG. 18 shows an implementation schematic view 4 of the further preferred embodiment of the present invention.

Referring to FIG. 2, which shows a block diagram of a preferred embodiment of the present invention, and it can be clearly seen from the drawing that an improved modular structure to expand and enhance SIM (Subscriber Identity Module) card functionality of the present invention is fitted to a predetermined mobile communication device 31, and the predetermined mobile communication device 31 comprises a subscriber identity module 4. The subscriber identity module 4 can be configured as a single slot configuration, and is further fitted with an electrical connection module 41; in addition, an expansion and enhancement module 3 comprises:

A controller 5, which is electrically connected to the electrical connection module 41, and the controller 5 is provided with a special control function which enables the controller 5 to expand value-added functionality of a SIM card, for example, one of related value-added customer services, including single card multiple number, member identification, cost saving phone calls, and so on. Furthermore, the controller 5 can be an NFC (Near Field Communication) module.

A subscriber identity module card 6 is electrically connected to the controller 5.

A Dual-interface card (Combi card) 7, which is electrically connected to the controller 5, and the Dual-interface card 7 is electrically connected with a contact portion 71. The Dual-interface card 7 is provided with a contactless access antenna and a contacting metal contact chip card, moreover, as for shared or all core components internal of the two interfaces, the shared core components can serve as a contact chip card for banking use, while the other adds a contactless transaction function similar to a travel card.

An antenna 8, and a conducting portion 81 able to assume an electrical contact with the contact portion 71 is located at an appropriate peripheral position of the antenna 8. The antenna 8 can be either a flat plate antenna or a film antenna, and the conducting portion 81 is located at an end of the antenna 8.

According to the aforementioned structure and constructional design, circumstances during operational use of the present invention are described hereinafter. Referring together to the drawings depicted in FIG. 2, FIG. 3, FIG. 4, FIG. 5 and FIG. 6, which show the block diagram and implementation schematic views one, two, three and four respectively of the preferred embodiment according to the present invention, and it can be clearly seen from the drawings that the controller 5, the subscriber identity module card 6 and the Dual-interface card (Combi card) 7 of the expansion and enhancement module 3 of the present invention can be further electrically connected to a connecting plate 9, and an appropriate position of the connecting plate 9 is configured with a connecting portion 93 that electrically connects with the electrical connection module 41.

Furthermore, an appropriate position of the connecting plate 9 is configured with a first set of terminals 91 and a second set of terminals 92. The first set of terminals 91 and the second set of terminals 92 are electrically connected to the subscriber identity module card 6 and the Dual-interface card (Combi card) 7 respectively.

When using such a configuration, the user must first cut out the subscriber identity module card 6 and the Dual-interface card (Combi card) 7 to a mini card size to enable placement into the connecting plate 9 having a size corresponding to the subscriber identity module 4. Moreover, an appropriate position of the connecting plate 9 is configured with the contact portion 71, thereby enabling the Dual-interface card (Combi card) 7 to use the contact portion 71 to make electrical contact with the conducting portion 81 of the antenna 8. When installed into the mobile communication device 31, a flexible flat cable 82 extending from an appropriate peripheral position of the antenna 8 enables the antenna 8 to circle round a battery 32, thereby allowing the antenna 8 to adjoin to the surface of the battery 32. Accordingly, the present invention is provided with the practical advancement of achieving contactless transaction functionality without the need to replace the SIM card or system operator.

Referring together to FIG. 2, FIG. 7, FIG. 8, FIG. 9 and FIG. 10, which show the block diagram of the preferred embodiment and implementation schematic views one, two, three and four of another preferred embodiment respectively according to the present invention, and it can be clearly seen from the drawings that the controller 5, the subscriber identity module card 6 and the Dual-interface card (Combi card) 7 of the expansion and enhancement module 3 of the present invention can be further electrically connected to the connecting plate 9, and an appropriate position of the connecting plate 9 is configured with the connecting portion 93 that electrically connects with the electrical connection module 41.

Furthermore, an appropriate position of the connecting plate 9 is configured with the first set of terminals 91 and the second set of terminals 92, and the first set of terminals 91 and the second set of terminals 92 are electrically connected to the subscriber identity module card 6 and the Dual-interface card (Combi card) 7 respectively.

When using such a configuration, the user does not need to cut out the subscriber identity module card 6 and the Dual-interface card (Combi card) 7 while still achieving the objective of the present invention.

When using such a configuration, the user does not need to cut out the subscriber identity chip 6 and the Dual-interface card (Combi card) 7 while still achieving the objective of the present invention.

Referring together to FIG. 2, FIG. 11, FIG. 12, FIG. 13 and FIG. 14, which show the block diagram of the preferred embodiment and implementation schematic views one, two, three and four of yet another preferred embodiment respectively according to the present invention, and it can be clearly seen from the drawings that the Dual-interface card (Combi card) 7 of the present invention can be configured as a film form, and the controller 5 can be located on the Dual-interface card 7, while an appropriate position of the Dual-interface card 7 is configured with the contact portion 71.

The subscriber identity module card 6 is first punched with a hole to form a through hole 72, and then the film is attached to the subscriber identity module card 6 using the through hole 72 to appropriately retain the controller 5. Accordingly, the subscriber identity module card 6 and the Dual-interface card (Combi card) 7 can be inserted into the subscriber identity module 4, and because an appropriate position of the film is configured with the contact portion 71, thus, the antenna 8 is able to use the conducting portion 81 to form an electrical connection with the contact portion 71.

Referring together to FIG. 2, FIG. 15, FIG. 16, FIG. 17 and FIG. 18, which show the block diagram of the preferred embodiment and implementation schematic views one, two, three and four of a further preferred embodiment respectively according to the present invention, and it can be clearly seen from the drawings that the subscriber identity module 4 of the present invention can be configured as a dual-slot form, and the dual-slot form can be configured with multiple forms. The controller 5 can be fitted within the subscriber identity module 4, and the subscriber identity module card 6 and the Dual-interface card (Combi card) 7 are separately placed within the subscriber identity module 4. The Dual-interface card 7 is electrically connected to the contact portion 71, and the contact portion 71 assumes an electrical contact with the conducting portion 81 of the antenna 8. Accordingly, the present invention is provided with the practical advancement of eliminating the need to replace the SIM card or system operator while realizing the practical advancement of achieving contactless transactions.

Hence, referring to all the drawings, compared to the prior art, the following advantages exist when using the present invention:

The expansion and enhancement module 3 of the present invention is fitted to the predetermined mobile communication device 31, and the predetermined mobile communication device 31 comprises the subscriber identity module 4. The subscriber identity module 4 is fitted with the electrical connection module 41, and the electrical connection module 41 is electrically connected with the controller 5. The controller 5 is separately electrically connected with the subscriber identity module card 6 and the Dual-interface card (Combi card) 7, wherein the Dual-interface card 7 is electrically connected with the contact portion 71, and the contact portion 71 assumes an electrical contact with the antenna 8. Accordingly, the present invention is provided with the practical advancement of eliminating the need to replace the SIM card or system operator while realizing the practical advancement of achieving contactless transactions.

In conclusion, the improved modular structure to expand and enhance SIM card functionality of the present invention is clearly able to achieve effectiveness and objectives when in use, and is indeed a practical and exceptional invention that complies with the essential elements as required for a new patent application. Accordingly, a new patent application is proposed herein.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. In a mobile communication device comprising a subscriber identity module card socket provided with an electrical connection module, the improvement wherein a modular structure to expand and enhance subscriber identity module car functionality is adapted to be connected with said mobile communication device, said modular structure comprising a connecting plate configured to be fitted into said subscriber identity module card socket, said connecting plate having a first side and a second side, said first side of said connecting plate being provided with a first set of terminals, a second set of terminals, and a controller, said second side of said connecting plate being provided with a connecting portion and a contact portion, said connecting portion of said connecting plate being electrically connected with said electrical connection module of said subscriber identity module card slot, said controller being provided with a control function which enables said controller to expand value-added functionality of a SIM card, an original subscriber identity module card cut to enable placement on said connecting plate thereby being electrically connected to said first set of terminals of said connecting plate, a dual-interface card cut to enable placement on said connecting plate thereby being electrically connected to said controller and said second set of terminals of said connecting plate, said dual-interface card being provided with a contactless access antenna and a contacting metal contact chip card, and an antenna having a flexible flat cable which has an end provided with a conducting portion, said conducting portion of said antenna being electrically connected with said contact portion of said connecting plate, said antenna being circled round a battery for said mobile communication device by means of said flexible flat cable thereby allowing said antenna to adjoin to a surface of said battery.

2. The modular structure to expand and enhance subscriber identity module car functionality as claimed in claim 1, wherein said dual-interface card is configured as a film form.

3. The modular structure to expand and enhance subscriber identity module car functionality as claimed in claim 1, wherein said controller is an NFC (near field communication) module.

4. The modular structure to expand and enhance subscriber identity module car functionality as claimed in claim 1, wherein said controller is provided with a control function including one of following related value-added customer surfaces: single card multiple number, member identification, cost saving phone calls.

* * * * *